United States Patent [19]

Medhurst

[11] 3,939,797

[45] Feb. 24, 1976

[54] ROTARY MEASURING INSTRUMENTS USING INCH OR METRIC SCALE

[75] Inventor: Cyril William Medhurst, Weybridge, England

[73] Assignee: British Aircraft Corporation Limited, London, England

[22] Filed: June 28, 1974

[21] Appl. No.: 484,291

[30] Foreign Application Priority Data
June 30, 1973 United Kingdom............... 31282/73

[52] U.S. Cl...................... 116/115.5; 116/DIG. 47
[51] Int. Cl.²........................................ B23Q 17/00
[58] Field of Search.................. 116/115.5, DIG. 47; 33/166

[56] References Cited
UNITED STATES PATENTS

| | | | |
|---|---|---|---|
| 3,315,633 | 4/1967 | Rabinow........................... | 116/115.5 |
| 3,536,031 | 10/1970 | Sindall............................. | 33/166 X |
| 3,696,776 | 10/1972 | Waplington...................... | 116/115.5 |
| 3,714,924 | 2/1973 | Jankowski et al. .............. | 116/115.5 |
| 3,716,015 | 2/1973 | Godfrey........................... | 116/115.5 |

FOREIGN PATENTS OR APPLICATIONS

| | | | |
|---|---|---|---|
| 1,221,394 | 2/1971 | United Kingdom............... | 116/115.5 |

Primary Examiner—Donald O. Woodiel
Assistant Examiner—Daniel M. Yasich
Attorney, Agent, or Firm—Cushman, Darby & Cushman

[57] ABSTRACT

A compact rotary instrument for accurately measuring small movements of a machine tool leadscrew, the instrument having one continuous decimally divided scale which indicates the measurement in either the metric or the inch system as selected by an operator. The instrument encloses a gear system which can be changed from a direct drive condition in which the rotary motion of the leadscrew drives an annular scale at a 1:1 ratio to an indirect drive condition in which the rotary motion of the leadscrew drives the scale through a gear train having two externally formed ring gears and two pinion gears carried on a stub shaft, at a 1.27:1 ratio. The selection is by means of an annular rotatable selector having two spaced marks formed thereon against which the scale can be read by an operator, the rotational positions of the selector and the spacing of the marks being such that when direct drive is selected only one mark is visible by an operator and when indirect drive is selected only the other mark is visible.

7 Claims, 2 Drawing Figures

ROTARY MEASURING INSTRUMENTS USING INCH OR METRIC SCALE

FIELD OF THE INVENTION

This invention relates to rotary instruments for indicating measurements in English and Metric units alternatively and suitable for use with apparatus, for example machine tools, having a shaft, for example a leadscrew, whose rotational movement is proportional to a linear movement to be measured by the instrument.

BACKGROUND OF THE INVENTION

An instrument of this type is described in my U.S. Pat. No. 3,651,780; it has a fixed pointer or mark and a rotatable cylindrical scale which is read against the mark. The instrument of U.S. Pat. No. 3,651,780 includes an epicyclic gear system drive which although efficient and effective is relatively expensive to manufacture.

An object of the present invention is to provide an instrument which is simpler and hence cheaper to manufacture than the instrument of U.S. Pat. No. 3,651,780.

A further object is to provide such a simpler instrument in which the drive ratio can be 1.27:1 instead of 2.54:1 so that when the instrument is adapted for use with an English leadscrew, the increase in the speed of rotation of the scale when set for Metric representation is more acceptable to the eye. Also the rate of wear is reduced.

Yet a further object of the invention is to provide an instrument which is simple to adapt for use with either English or Metric leadscrews.

Yet a further object of the invention is to provide an instrument in which the setting of a zero reading is readily and positively accomplished.

SUMMARY OF THE INVENTION

The foregoing and other objects are fulfilled in the preferred embodiment of the invention in which a rotary instrument, for indicating measurements in English and Metric units alternatively and suitable for use with apparatus having a shaft whose rotational movement is proportional to a linear movement to be measured by the instrument, includes in combination, a first rotary unit adapted to be secured to the shaft and a secondary rotary unit rotatable with respect to the first rotary unit, a first external annular gear member fixed to said first rotary unit, a second external annular gear member fixed to said secondary rotary unit and co-axial with said first gear member, an annular scale member, on which a single continuous scale is formed, carried by said second rotary unit, an annular stationary unit, a drive unit for transmitting rotary movement between said first rotary unit and said second rotary unit including a first pinion gear member meshing with said first annular gear member, a second pinion gear member meshing with the second annular gear member, and an axially shiftable stub shaft upon which the first and second pinion gear members are fixed, location means to anchor the stub shaft selectively to the stationary member, wherein a drive ratio which corresponds to or bears a simple relationship to the ratio between English and Metric units of length is provided between said first and said second rotary unit, or to the second rotary unit, wherein a 1:1 gear ratio is provided between said first and said second rotary unit, gear ratio shift means, operatively associated with said stub shaft, and co-operating means mounting said shift means on said stationary member such that rotation of said shift means effects axial translation of said stub shaft from a position anchored to said stationary unit to a position anchored to said second rotary unit, and two spaced marks formed upon said shift means against which the continuous scale can be read, the marks being so spaced that when the stub shaft is anchored to said stationary unit only one mark is visible to an operator and when the stub shaft is anchored to said second rotary unit only the other mark is visible.

Preferably the drive ratio between the first and second rotary units when the third and fourth gear members are anchored with respect to the stationary unit is 1.27:1 or the reciprocal thereof.

Preferably the gear location means comprises an axially movable shaft.

BRIEF DESCRIPTION OF THE DRAWINGS

One preferred embodiment of the invention is described in the accompanying drawings. In these drawings.

DETAILED DESCRIPTION

Figure 1:
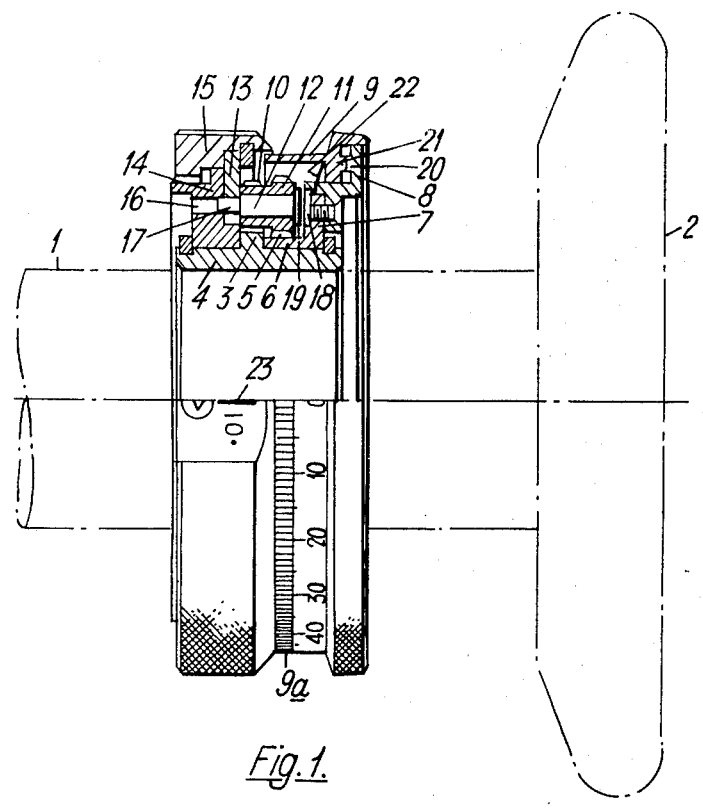
FIG. 1 is a part-sectional part-plan view of an instrument for use with a machine having an English lead screw, the instrument being set to provide a reading in Metric units, and FIG. 2 similar is a part-plan view of the same instrument set to provide a reading in English units, that is to say the gear ratio shift means has been rotated through one half of one turn.

Referring now to the drawings, an instrument is mounted on a shaft 1 of a machine tool adjacent a handwheel 2. The instrument has a first rotary unit which includes an annular gear 3, having 127 teeth, formed upon a sleeve 4 which is secured to the shaft 1 for rotation therewith. The shaft 1 is coupled to an English leadscrew (not shown) of the machine tool. The instrument further has a second rotary unit including an annular gear 5, having 125 teeth, formed upon a sleeve 6 co-axially mounted for rotation on the sleeve 4. Mounted on a radially extending extension 7 of the sleeve 6 for rotation therewith is an annular carrier member 8. This latter member itself carries a cylindrical scale member 9 upon which a scale 9a is formed. Rotational movement is transferred from the gear 3 to the gear 5 by means of a drive unit including a gear 10, having 16 teeth, meshing with the gear 3, and a gear 11, having 20 teeth, meshing with the gear 5, the gears 10 and 11 being formed integrally with one another. The gears 10 and 11 are mounted for rotation, upon a gear location means, shown being constituted by a stub shaft 12 projecting from a selector plate 13 which is carried by an annular selector member 15. The items 13 and 15 form a gear ratio shift means which is part of a stationary unit which further includes an annular backing member 14 secured to a stationary part of the machine tool by bolts (not shown). The backing member has an external screw thread which co-operates with an internal thread formed upon the selector member 15. The selector member 15 is rotatable through half of one turn between defined positions during which movement it, together with its selector plate 13, which being separate from the selector member 15 does not rotate, is caused to shift axially by a predetermined amount. The backing member 14 has an axially extending bore 16 within which a spigot 17 formed on the left hand end (as drawn) of the stub shaft 12 can slidably locate. Similarly, that radial portion 7 of the sleeve 6 has an axially extending bore 18 within which a spigot 19 formed on the right hand end (as drawn) of the stub shaft 12 can slidably locate. The amount by which the stub shaft 12 can shift axially under the action of the selector plate 13 is determined by these bores 16 and 18; when the spigot 17 is engaged with the bore 16 the spigot 19 is free of the bore 18 and vice versa.

The carrier member 8 has an annular radially extending face 20 upon which a series of serrations are formed. These serrations are matched by a further series of serrations formed upon an opposing annular radially extending face 21 on the scale member 9. The two sets of serrations are urged into mating engagement by a spring member 22 anchored between the radial portion 7 and the carrier member. In this position the members 8 and 9 cannot rotate relatively, but when the member 9 is urged axially by hand against the bias of the spring member 22 so that the sets of serrations dis-engage, then relative rotation is possible.

The selector member 15 carries a mark 23 (FIG. 1) which lies on an upper region of the member 15 when the spigot 17 is fully engaged with the bore 16 and so is viewable by an operator. The member 15 also carries a mark 24 (FIG. 2) which lies 180° from the mark 23 and therefore cannot be seen by an operator in the condition of FIG. 1. The mark 24 lies in the upper region, as shown in FIG. 2, when the spigot 19 is fully engaged with the bore 18.

When it is desired to obtain a reading in Metric units, the instrument is set as shown in FIG. 1. The mark 23 is positioned coincident with the axis of rotation of the shaft 1 when viewed as by an operator from above. The rotation of the selector member 15 to effect such positioning of the mark 23 draws the stub shaft 12 to the left, as drawn, and causes its spigot 17 to locate within the bore 16. The stub shaft 12 is, accordingly, anchored to the stationary backing member 17 and the drive from the gear 3 to the gear 5 is by way of the gears 10 and 11 thus providing a 1.27:1 ratio between the shaft 1 and the scale member 9. The mark 23 is provided with an indication that the scale is reading in 0.01 mm steps.

When it is desired to obtain a reading in English units the selector member 15 is rotated through one half of one turn (180°) so that the stub shaft 12 is moved axially to the right until its spigot 19 engages the bore 18. In this condition the stub shaft 12 is anchored to that member carrying the gear 5; there is thus a direct connection between the gear 3 and the scale member 9 which thus rotates solidly with the shaft 1 in a ratio of 1:1.

Figure 2:
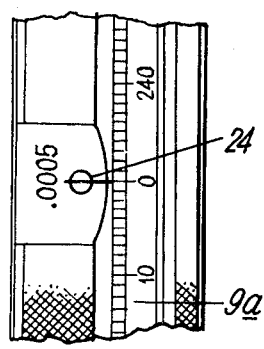

As shown in FIG. 2, the selector member 15 now presents the mark 24 to the operator. This mark is provided with an indication that the scale 9a now reads in 0.0005 inch steps.

Alternatively the scale can be engraved to read in the larger steps of 0.02 mm and 0.001 inch.

To effect adjustment of the scale member 9 relatively to its carrier member 8, for example to align a zero indication against either the mark 23 or the mark 24, the scale member 9 is pushed axially towards the selector member 15 against the bias of the spring 22. The serrations 20 and 21 thus become disengaged so that the member 9 can be rotated. When a desired adjusted position is reached the member 9 is released and is urged back so that the serrations again become engaged. The pitch of the serrations is chosen to be one half that of the graduations of the scale 10; the maximum zero error is thus 0.00025 inches or 0.005mm in the embodiment illustrated.

In an alternative arrangement suitable for use with a shaft coupled to a Metric lead screw the same gears 10 and 11 are used but are reversed axially relative to each other so that the gear 10 meshes with the annular gear 5 whilst the gear 11 meshes with the annular gear 3. The number of teeth on the two annular gears are also altered so that the gear 3 has 125 teeth whilst the gear 5 has 127 teeth.

Thus, when the drive to the scale member 9 is via the gears 10 and 11 the ratio will be the reciprocal of 1.27:1 and the conversion will be from Metric to English units.

I claim:

1. A rotary instrument for selectively indicating measurements in English and Metric units and suitable for use with apparatus having a shaft whose rotational movement is proportional to a linear movement to be measured by the instrument, including in combination, a first rotary unit adapted to be secured to the shaft, a secondary rotary unit rotatable with respect to the first rotary unit, a first external annular gear member fixed to said first rotary unit, a second external annular gear member fixed to said second rotary unit and co-axial with said first gear member, an annular scale member, on which a single continuous scale is formed, carried by said second rotary unit, an annular stationary unit, a drive unit for transmitting rotary movement between said first rotary unit and said second rotary unit including a first pinion gear member meshing with said first annular gear member, a second pinion gear member meshing with the second annular gear member, and an axially shiftable stub shaft upon which the first and second pinion gear members are fixed, location means to anchor the stub shaft selectively to the stationary member, wherein a drive ratio which corresponds to or bears a simple relationship to the ratio between English and Metric units of length is provided between said first and said second rotary unit, or to the second rotary unit, wherein a 1:1 gear ratio is provided between said first and said second rotary unit, gear ratio shift means, operatively associated with said stub shaft, and co-operating means mounting said shift means on said stationary member such that rotation of said shift means effects axial translation of said stub shaft from a position anchored to said stationary unit to a position anchored to said second rotary unit, and two spaced marks formed upon said shift means against which the continuous scale can be read, the marks being so spaced that when the stub shaft is anchored to said stationary unit only one mark is visible to an operator and when the stub shaft is anchored to said second rotary unit only the other mark is visible.

2. A rotary instrument according to claim 1 wherein the drive ratio between the first and second rotary units when the stub shaft is anchored to the stationary member is 1.27:1 or the reciprocal thereof.

3. A rotary instrument according to claim 1 wherein said location means comprise axially extending spigots formed on each end of said stub shaft and co-operating recesses formed within said stationary member and said second rotary unit.

4. A rotary instrument according to claim 1 wherein said two spaced marks are formed 180° apart and the co-operating means are such that rotation of said shift means to effect full axial translation of the stub shaft is one half of one turn.

5. A rotary instrument according to claim 1 wherein the said co-operating means comprise a screw and nut arrangement.

6. An instrument according to claim 1 wherein the second rotary unit includes an annular carrier member on which only the scale member is carried, the carrier member and the scale member having mating annular serrated faces which can be moved apart from an engaged position in which there is no relative rotation to a free position in which the carrier and the scale member are relatively rotatable so that a desired part of the scale can be aligned with the mark against which the scale is read.

7. An instrument according to claim 6 wherein biasing means are provided to urge the serrated faces into engagement.

* * * * *